(12) United States Patent
Owens et al.

(10) Patent No.: US 11,540,136 B2
(45) Date of Patent: Dec. 27, 2022

(54) DEVICE PAIRING

(71) Applicant: Fitbit, Inc., San Francisco, CA (US)

(72) Inventors: Irvin Owens, Alameda, CA (US); Ryan Matthew Krems, San Francisco, CA (US); Gilles Luc Jean François Boccon-Gibod, San Francisco, CA (US)

(73) Assignee: FITBIT, INC., San Francisco, CA (US)

( * ) Notice: Subject to any disclaimer, the term of this patent is extended or adjusted under 35 U.S.C. 154(b) by 64 days.

(21) Appl. No.: 16/808,735

(22) Filed: Mar. 4, 2020

(65) Prior Publication Data

US 2020/0288303 A1  Sep. 10, 2020

Related U.S. Application Data

(60) Provisional application No. 62/814,158, filed on Mar. 5, 2019.

(51) Int. Cl.
*H04W 12/50* (2021.01)
*H04W 12/06* (2021.01)
(Continued)

(52) U.S. Cl.
CPC ............ *H04W 12/50* (2021.01); *G06F 1/163* (2013.01); *G06F 21/43* (2013.01); *H04W 4/80* (2018.02); *H04W 12/06* (2013.01)

(58) Field of Classification Search
CPC ....... H04W 12/50; H04W 12/06; H04W 4/80; G06F 1/163; G06F 21/43
See application file for complete search history.

(56) References Cited

U.S. PATENT DOCUMENTS 8,738,783 B2    5/2014  Bathiche et al.
8,947,239 B1 *  2/2015  Park .................. H04L 69/18
                                                340/573.1
(Continued)

FOREIGN PATENT DOCUMENTS

KR    1020140094252    7/2014
KR    1020150049440    5/2015

OTHER PUBLICATIONS

International Search Report for Application No. PCT/US2002/021101, dated Jun. 23, 2020, 11 pages.

*Primary Examiner* — Lester G Kincaid
*Assistant Examiner* — Maryam Soltanzadeh
(74) *Attorney, Agent, or Firm* — Dority & Manning, P.A.

(57) ABSTRACT

Alternative pairing is used to enable communication between devices, but without conventional processes required for pairing. Moreover, multiple wireless bonds may be enabled, where both a device is linked to another device and an account is associated with the device and also a backend server. Once an appropriate bond is established, a streaming app (or partial or lightweight version of an application including a selected subset of application functionality) can be streamed to a device such that the user can enter information that can be transmitted to a paired device over the wireless connection. This can enable the association of the device to be performed with respect to the backend servers of the relevant provider. Such an approach can also establish a mechanism for the user to create an account while downloading the full application, or remainder of the application in some embodiments, in the background.

20 Claims, 20 Drawing Sheets

(51) Int. Cl.
  *H04W 4/80*   (2018.01)
  *G06F 1/16*   (2006.01)
  *G06F 21/43*  (2013.01)

(56) References Cited

U.S. PATENT DOCUMENTS

2012/0159472 A1* 6/2012 Hong ............... H04L 67/08
                                                  717/178
2012/0254987 A1  10/2012 Ge et al.
2018/0063284 A1*  3/2018 Doar ............... G06F 3/0665
2018/0249519 A1*  8/2018 Hanes ............... H04W 76/14

* cited by examiner

DEVICE PAIRING

CROSS REFERENCE TO RELATED APPLICATIONS

This application claims priority to and the benefit of U.S. Provisional Patent Application Ser. No. 62/814,158 filed Mar. 5, 2019 titled "DEVICE PAIRING," the full disclosure of which is hereby incorporated herein by reference in its entirety for all purposes.

BACKGROUND

Users are increasingly utilizing new and varying types of computing devices, such as wearable devices, portable devices, and internet of things (IoT) devices. In order to utilize these devices optimally, it is often necessary (or at least desirable) to pair the devices with at least one other computing device, such as a tablet or smartphone with network connectivity. This enables the new device to leverage resources of the other computing device, as well as to receive applications, data, and updates over the paired connection that the other computing device is able to obtain using the network connection. The pairing process can be frustrating for some users, such as where each new pairing requires manual pairing process.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the pairing, updating, and/or communicating of electronic devices. Various embodiments provide what may be referred to as alternative pairing. Alternative pairing results in paired devices that are able to communicate as known for conventional pairing, but without the conventional process required for the pairing. Pairing in some embodiments can take advantage of wireless bonding using a wireless technology such as Bluetooth®. For users of a wearable computing device, such as a fitness tracker, to utilize the tracker as designed, however, more than a wireless bond may be desired. This may include users establishing an account with a device provider, such as Fitbit®, and exchanging relevant data. To facilitate, an experience can be provided that is able to perform a rapid pairing of the devices. Once an appropriate bond is established, a streaming app (or partial or lightweight version of an application including a selected subset of application functionality) can be streamed to the tracking device such that the user can enter information that can be transmitted to a paired device over the wireless connection. This can enable the association of the device to be performed with respect to the backend servers of the relevant provider. Such an approach can also establish a mechanism for the user to create an account while downloading the "full" application, or remainder of the application in some embodiments, in the background (assuming user permission has been obtained in at least some embodiments). Various other functions can be implemented within the various embodiments as well as discussed and suggested elsewhere herein.

Figure 1:
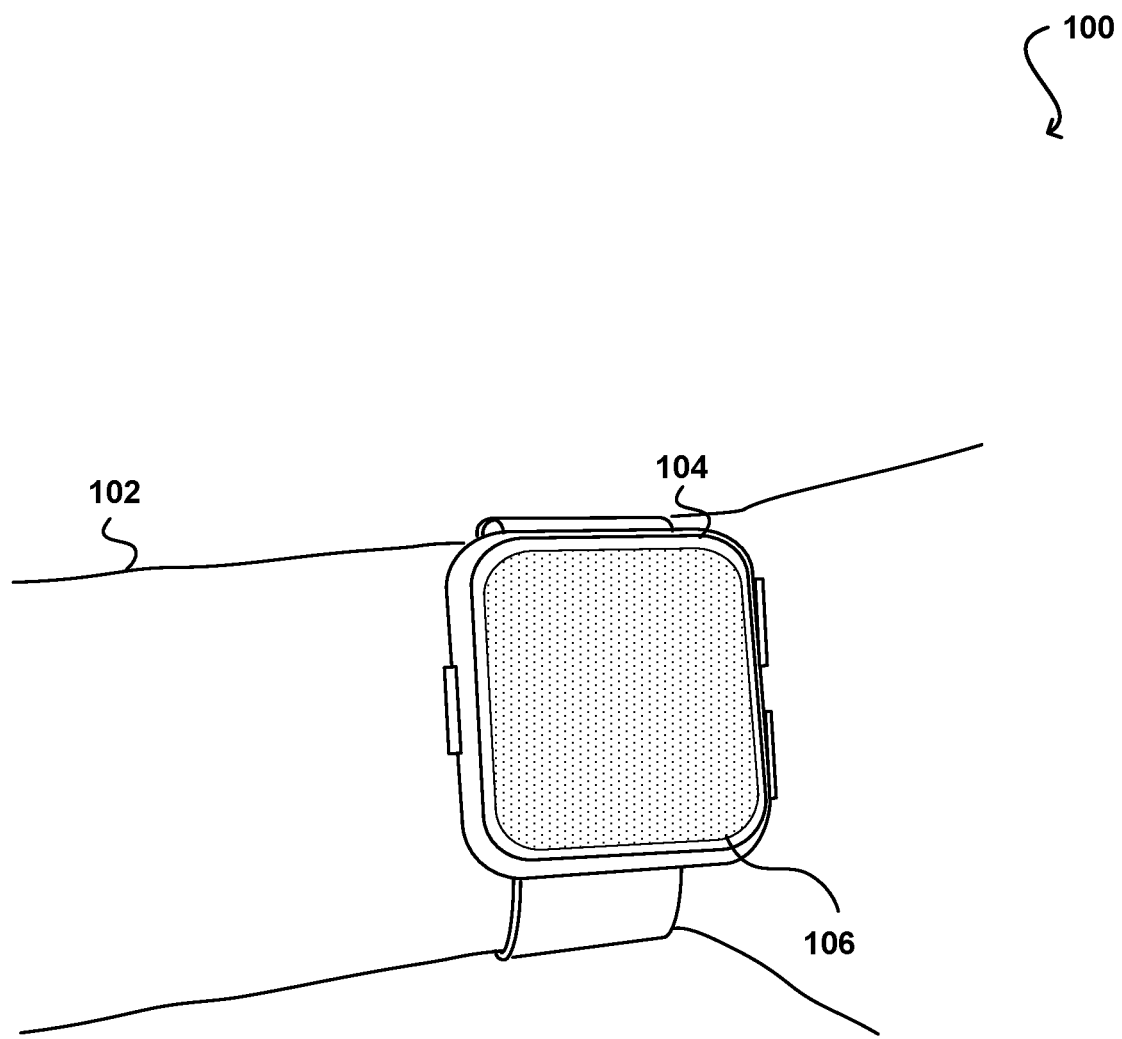
FIG. 1 illustrates an example device that can be utilized in accordance with various embodiments.

FIG. 1 illustrates an example wearable device 100 that can be utilized in accordance with various embodiments. In this example the device is a smart watch, although fitness trackers and other types of devices can be utilized as well. Further, although this device is shown to be worn on a user's wrist there can be other types of devices worn on, or proximate to, other portions of a user's body as well, such as on a finger, in an ear, around a chest, etc. For many of these devices there will be at least some amount of wireless connectivity, enabling data transfer between a networked device or computing device (e.g., a smartphone) and the wearable device. This might take the form of a Bluetooth® connection enabling specified data to be synchronized between a user computing device and the wearable device, or a cellular or Wi-Fi connection enabling data to be transmitted across at least one network such as the Internet or a cellular network, among other such options.

Figure 2:
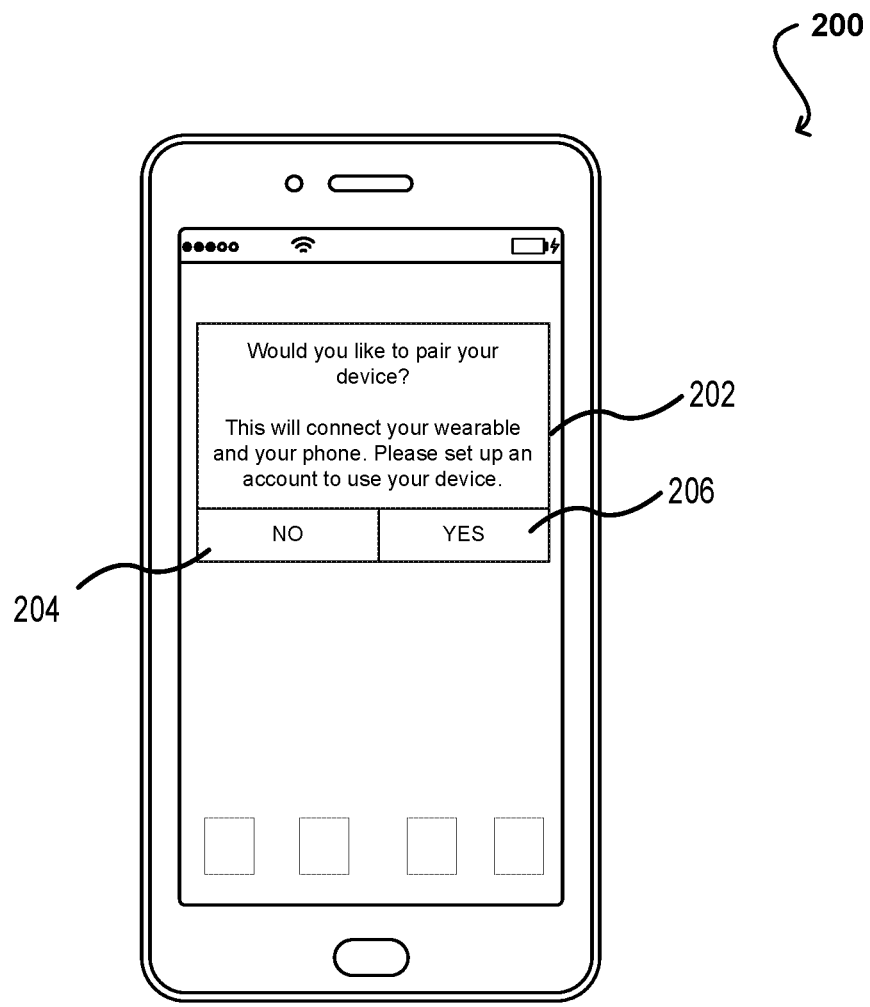
FIG. 2 illustrates an example interface that can be rendered in accordance with various embodiments.

FIG. 2 illustrates an example display 200 that can be rendered on a computing device to be paired with a target device, such as the wearable device of FIG. 1, in accordance with various embodiments. Although a smartphone is displayed, it should be understood that other types of computing devices can be used as well as discussed and suggested herein. In this example, the devices might detect each other using a wireless communication, such as over Bluetooth® or another out of band channel. In this example, the software on the phone can detect a type of device based on the pairing information, and can generate a prompt 202 for the user asking whether they would like to pair their wearable (or other detected device). In this example, explanatory text is provided indicating to the user that the process will establish a connection between the wearable and the phone, and that the user will have to establish or verify an account with a specific provider in order to be able to utilize at least some of the functionality of the wearable device. Moreover, one or more selectable elements 204, 206 may be provided to receive feedback from the user. For example, the selectable elements 204, 206 may correspond to a response regarding the prompt 202. In this example, the prompt 202 provides a question to the user regarding pairing devices and the selectable elements 204, 206 correspond to a response to the question that provides permission to perform the pairing. It should be appreciated that the selectable elements 204, 206 may be time-based such that no response provided after a certain period of time may correspond to a "no" or lack of permission.

Figure 3:
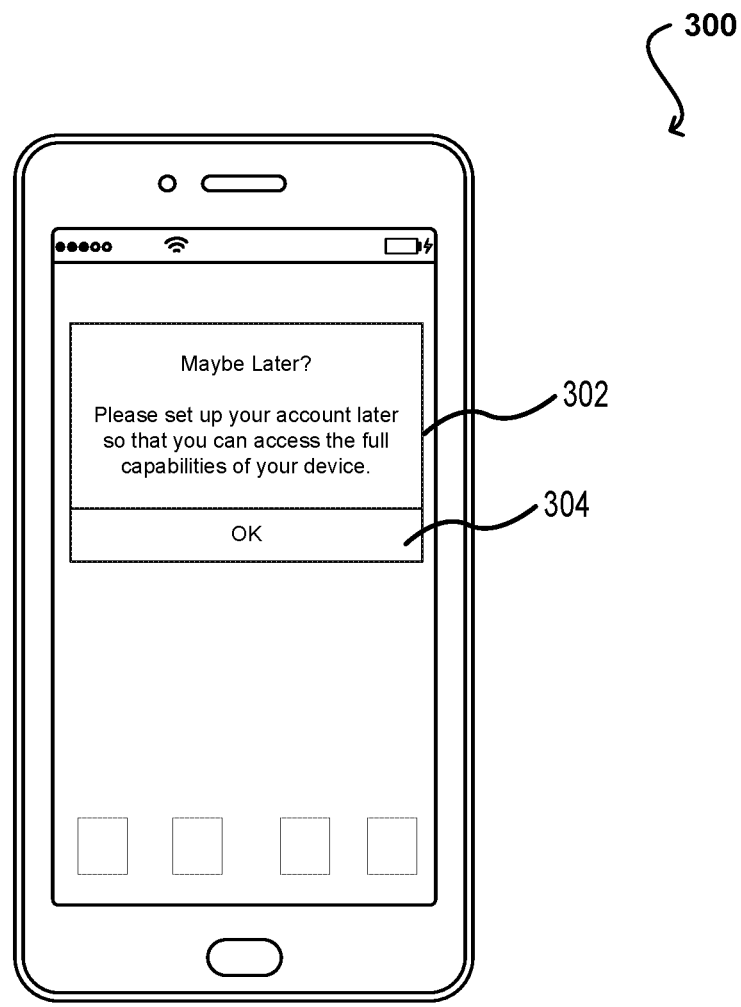
FIG. 3 illustrates an example interface that can be rendered in accordance with various embodiments.

In this example, if the user selects not to pair at this time then another message 302 of the display 300 can be rendered as illustrated in FIG. 3, which reminds the user to pair the devices or perform the setup at a later time. The illustrated embodiment also includes a selectable element 304 that corresponds to an acknowledgement from the user regarding the message 302. As noted above, the message 302 may be time-based such that a period of time without a response via the selectable element 304 is deemed an acknowledgement and the message 302 may be removed from the screen.

Figure 4:
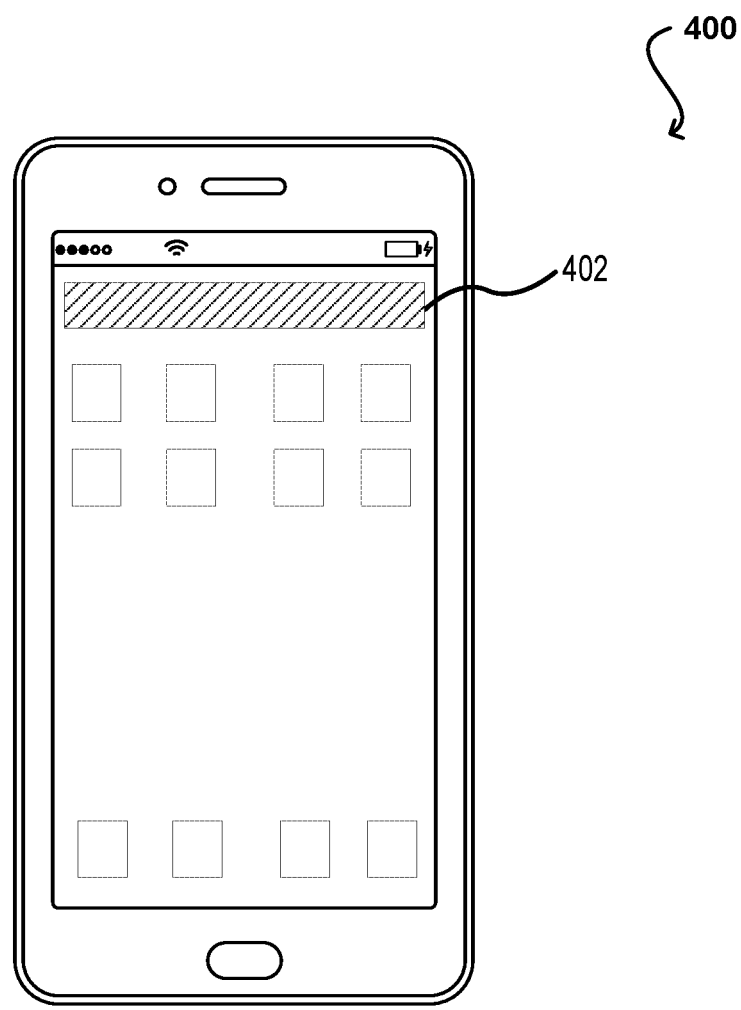
FIG. 4 illustrates an example interface that can be rendered in accordance with various embodiments.

In the display 400 of FIG. 4, the user has already installed the mobile application and is logged in then because a code was pre-shared with the provider backend. The flow can then jump straight to a firmware update (reflected in the status bar 402). Otherwise, the registration or log-in flow discussed herein will have to be followed in at least some embodiments. In this example, a Bluetooth low energy (BLE) bond is occurring. The user can click on the bar to go to the next step in some embodiments, but potentially not for actual users. If the user has already installed the application and logged in, the flow would be as discussed below.

Figure 5:
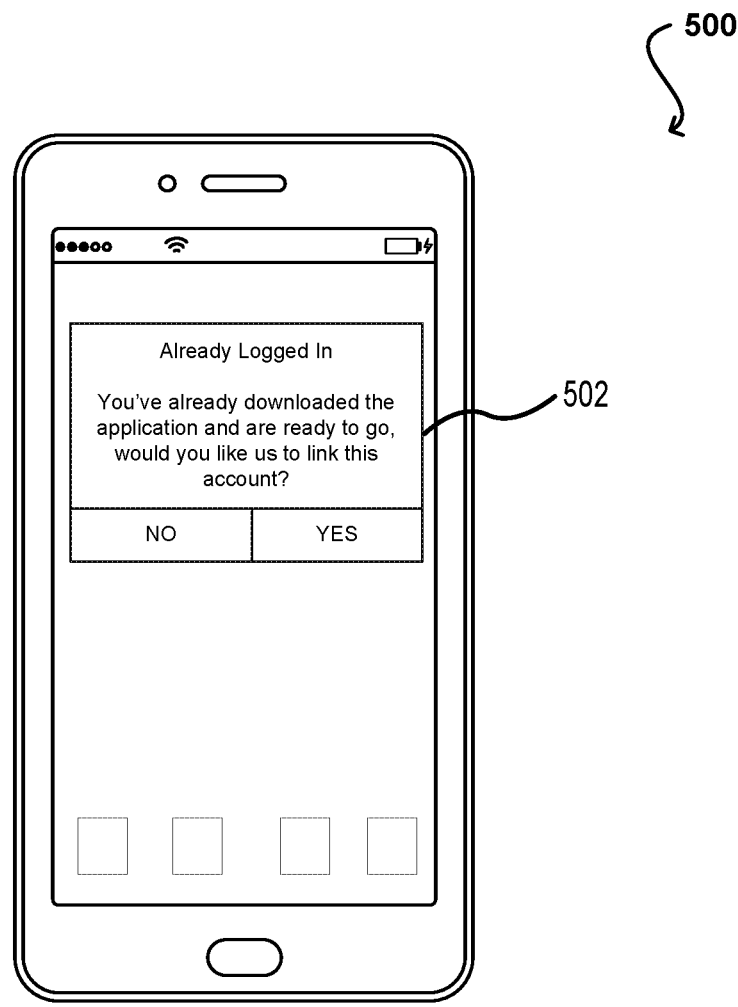
FIG. 5 illustrates an example interface that can be rendered in accordance with various embodiments.

If the application is already installed and the user is logged in, a display 500 can be rendered as illustrated in FIG. 5 that indicates that the user already has the application and is ready to go, whereby the user can simply elect to link this device to the user's existing account. This might be the case where the user gets a new wearable device and pairs the new device to the user's phone that was previously connected to the user's old wearable device. This information can be provided through a prompt 502 as illustrated. At this point the Bluetooth® bond has been completed, and the user can be asked to set up the account with the quick-registration device. The backend server can identify the streaming application that the companion app developer has linked to the quick-registration setup. In the background the application can be downloaded if approved by the user.

This part of the process can require coordination between the mobile operating system and a back-end server in some embodiments. Both the back-end server and the Bluetooth® peripheral can be running a mutation algorithm in a predictable fashion over a secret that was provided to both the provider backend as well as that is established in the factory provisioning in the peripheral hardware. This code should always be encrypted in at least some embodiments.

A code of arbitrary length can be advertised by the peripheral hardware as part of the Bluetooth® advertisement in this example. This code can change on a pre-defined interval which should not be the same for every user. This code should be accompanied by a payload for additional information that is encrypted with the pre-shared secret. The security provided by such an arrangement may be below a desirable level (e.g., a level acceptable for personal user data), and as a result, no sensitive information (e.g., personal user data) would be sent in the payload. The code can be forwarded by the mobile OS to the provider servers, which can respond to the valid code and payload with the link or address (e.g., a URI) to use to download the streaming app.

As the payload and code have been provided to the server, the server can set up a provisional account for the user (still anonymous) with the serial number of the peripheral to skip several potential steps in the onboarding, such as choosing an item from a list and going through the somewhat complex authentication by reading data and fetching data from the device.

Figure 6:
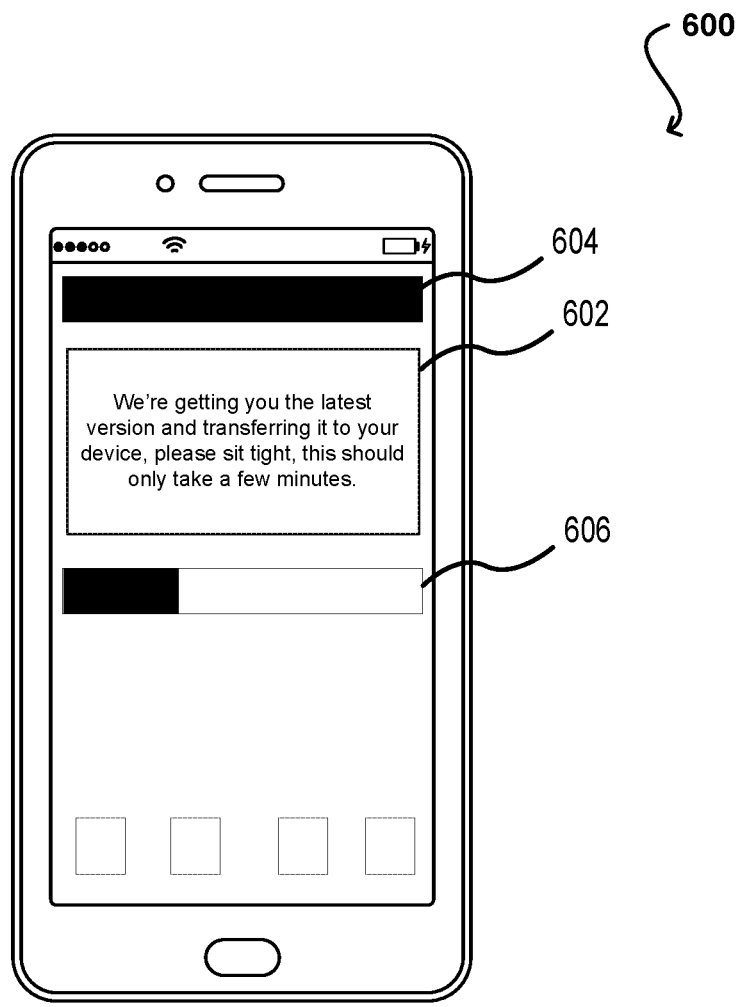
FIG. 6 illustrates an example interface that can be rendered in accordance with various embodiments.
Figure 7:
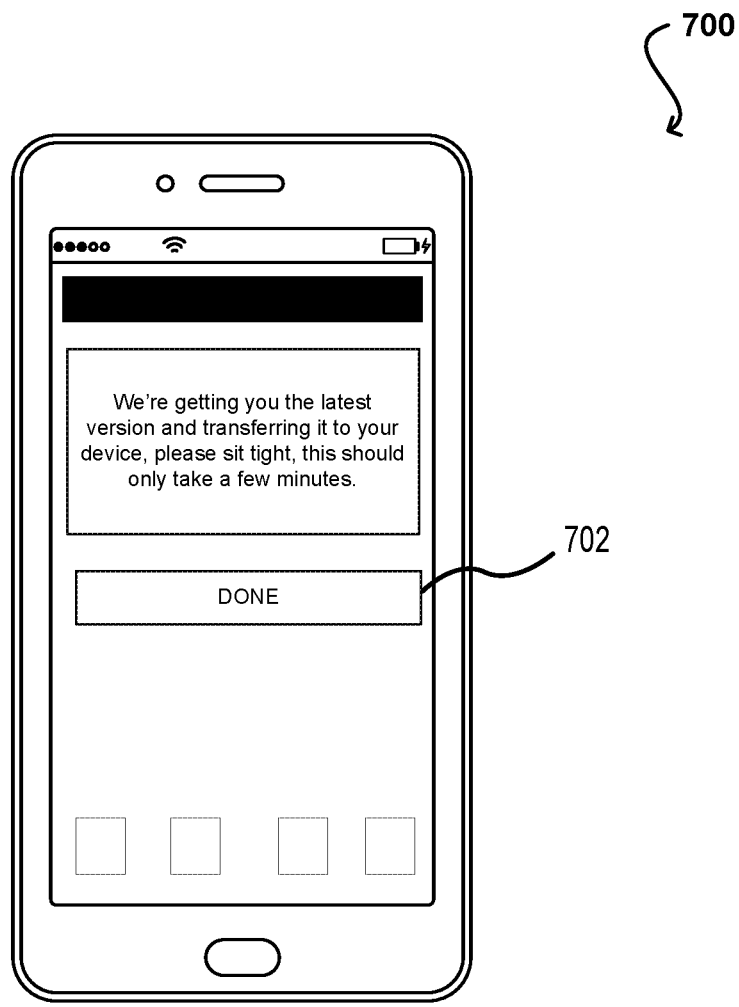
FIG. 7 illustrates an example interface that can be rendered in accordance with various embodiments.

The example display 600 of FIG. 6 can be rendered when the pairing is done and the firmware is to be delivered to the wearable (or other peripheral) device. Status information 602 for the delivery and update can be provided. In this example process, the selection and reading of data was skipped, such that the only data to be sent can be to tell the wearable device the account to which it is attached. It should be appreciated that multiple status bars 604, 606 may be provided for different aspects of the update. For example, downloading the firmware update may correspond to status bar 604, which is complete, while transferring may correspond to status bar 606, which is still in progress. Once the update process is complete, a display 700 can be rendered as illustrated in FIG. 7, and the user can select an option 702 to end the process in this example, although other processes might handle this automatically. The registration flow, above the full application, is now 100% downloaded. Between this and the prior display, the process in this example will have gone through a conventional wireless data exchange to fetch secondary encrypted data from the wearable device and sending it to the backend. The user can be authenticated, the wearable device updated, and the account attachment data pushed to the wearable device.

Figure 8:
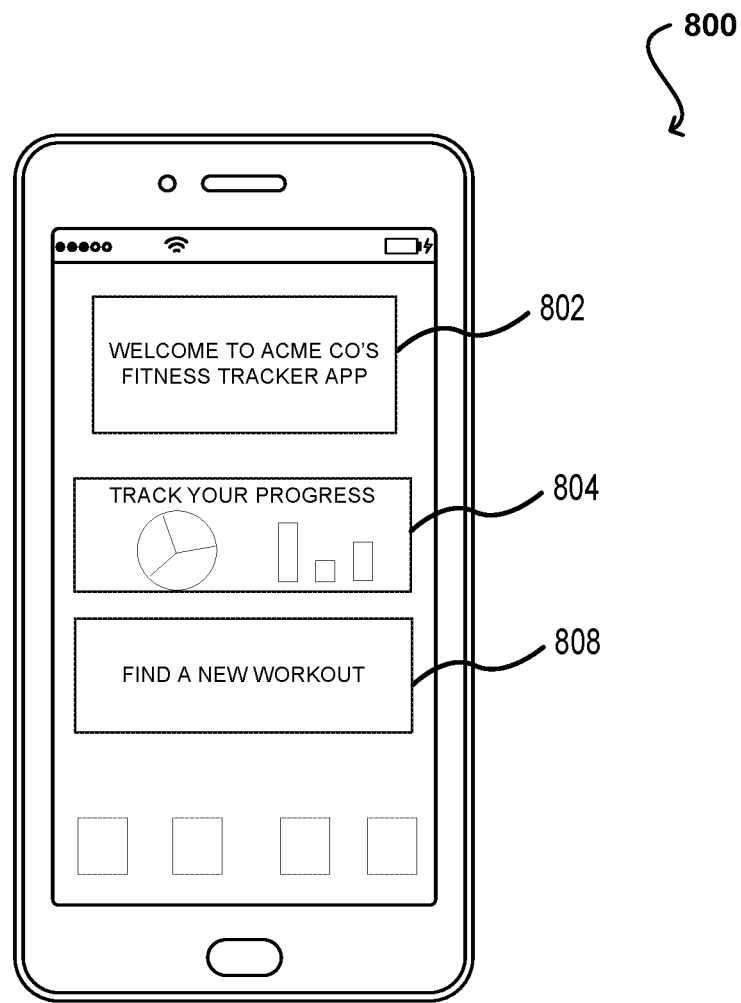
FIG. 8 illustrates an example interface that can be rendered in accordance with various embodiments.

Once the user selects a complete option, such as the done button in FIG. 7, a display 800 can be rendered as illustrated in FIG. 8. The intent to launch the main body of the application can have been sent, knowing that the application is fully downloaded. Now the user is fully on-boarded and can use their wearable device as designed. The display 800 includes a variety of information and/or selectable elements 802, 804, 806 that enables the user to navigate the application. As will be appreciated, in various embodiments, certain features of the application may be linked to and receive information from the user's wearable device. For example, information regarding a workout session may be transferred to the smart phone and uploaded to the server, where data may be aggregated and presented to the user.

Figure 9:
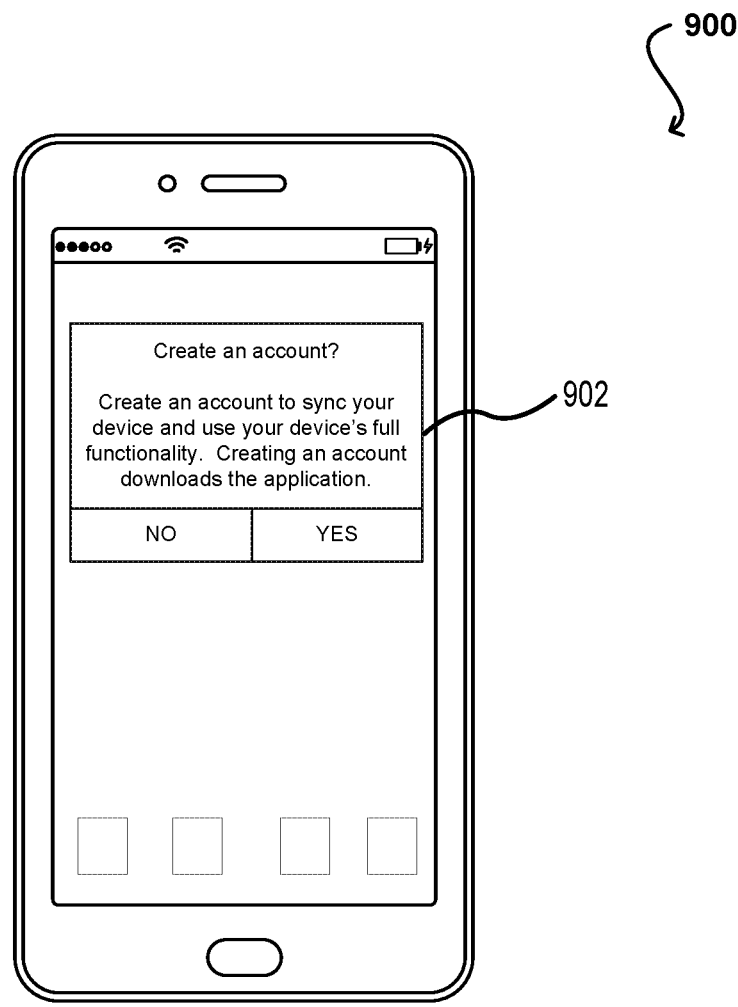
FIG. 9 illustrates an example interface that can be rendered in accordance with various embodiments.

It might be the case, however, that the application is not installed on the smartphone and the user is a new user who does not yet have an account, or is not yet registered, with the provider. In this example, a display 900 can be rendered as illustrated in FIG. 9. A prompt 902 can be displayed that can indicate that the process to create an account will allow the user to sync steps and use applications for the wearable device, as well as to install the full application on the smartphone, among other such options. This part of the sequence can require coordination between the mobile OS and a backend provider server as discussed previously.

Figure 10:
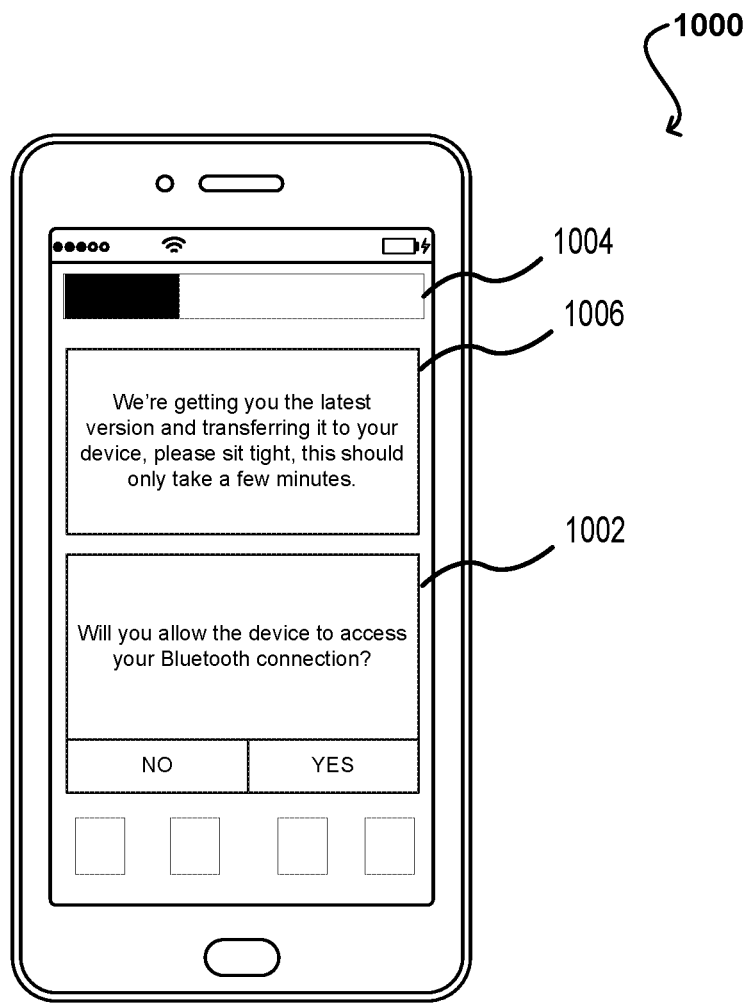
FIG. 10 illustrates an example interface that can be rendered in accordance with various embodiments.

If the user agrees to create an account, a display 1000 can be rendered as illustrated in FIG. 10. This example includes a prompt 1002 asking the user to grant wireless and scanning permissions, although other options may be provided as well. This can be part of a "quick-registration" app which would allow the user to setup a provider account and complete the fetch of data for transfer to the provider server, in order to enable to the user to obtain the relevant functionality. At this point the streaming application has downloaded and the first screen is displayed. The smartphone has established a connection with the peripheral. The screen can be displayed as a modal over the launch screen of the device to further enhance the seamless nature of the setup. The permissions required for the streaming application to operate should be shown to the user in at least some embodiments, and if they agree then the user may continue to setup their wearable device. If the user declines the streaming application should exit or return to a regular flow in this example. The permissions granted to the streaming application should be also given to the verified and signed application downloading in the background.

The provider of the operating system (OS) on the smartphone may expose libraries that can be leveraged to enable the streaming application to be displayed "over" or in place of the screens provided by the operating system, such as a modal window or panel. The OS provider may also expose server endpoints to provide tokens through to the provider backend that the provider backend can validate. The streaming application in at least some embodiments can also have relevant location and/or wireless communication permissions.

As noted above, the display 1000 may also include a progress bar 1004 and an informational bar 1006 to provide information to the user during the set up progress. For example, upon receiving permission to access certain features of the device, the download of the application may complete to enable the user to set up registration. In various embodiments, the prompt 1002 may delay downloading and/or use of the application until a response is received from the user granting permission.

Figure 11:
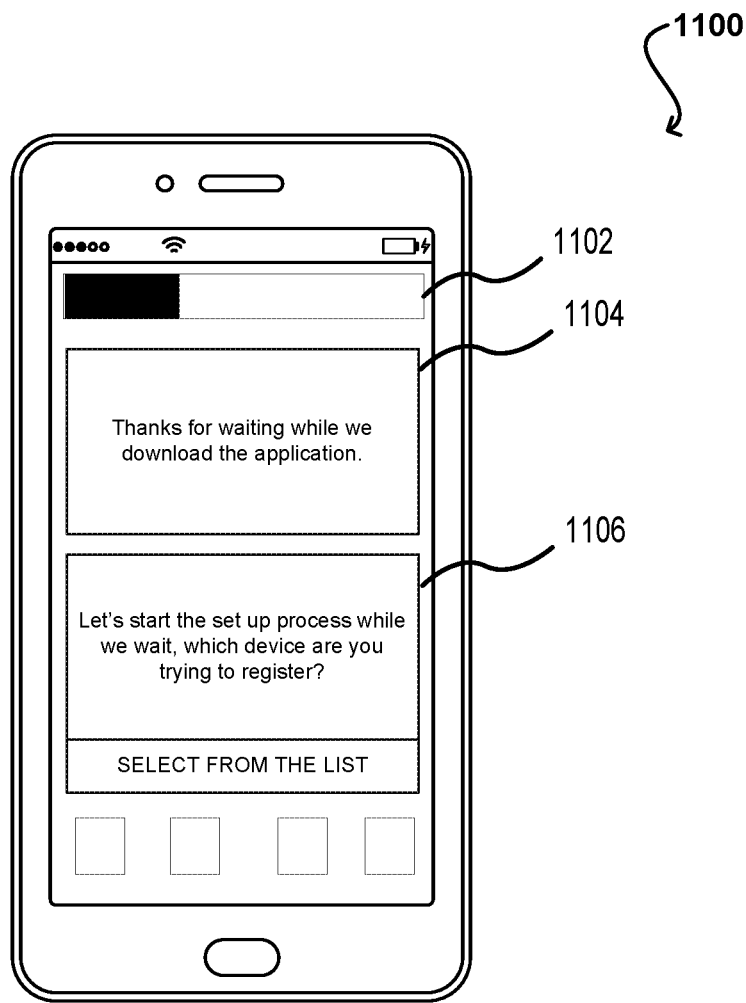
FIG. 11 illustrates an example interface that can be rendered in accordance with various embodiments.

The example display 1100 of FIG. 11 can include information for the quick-registration app. This can enable the user to setup a provider account and complete the fetch of data for transfer to the provider server to enable the user to have access to the relevant functionality. Behind the scenes, the process can scan and connect to the device, as well as download assets that are needed to complete the onboarding. For example, a progress bar 1102 may continue to provide information regarding the status to the user while an information bar 1104 further identifies the status of the download. In various embodiments, pre-registration information may also be provided, for example through a prompt 1106, which may be related to the download. For example, different functionality may be provided for different devices, and as a result, knowing the device prior to and/or during the download may enable different downloads and the like to occur at once, rather than waiting until later.

Figure 12:
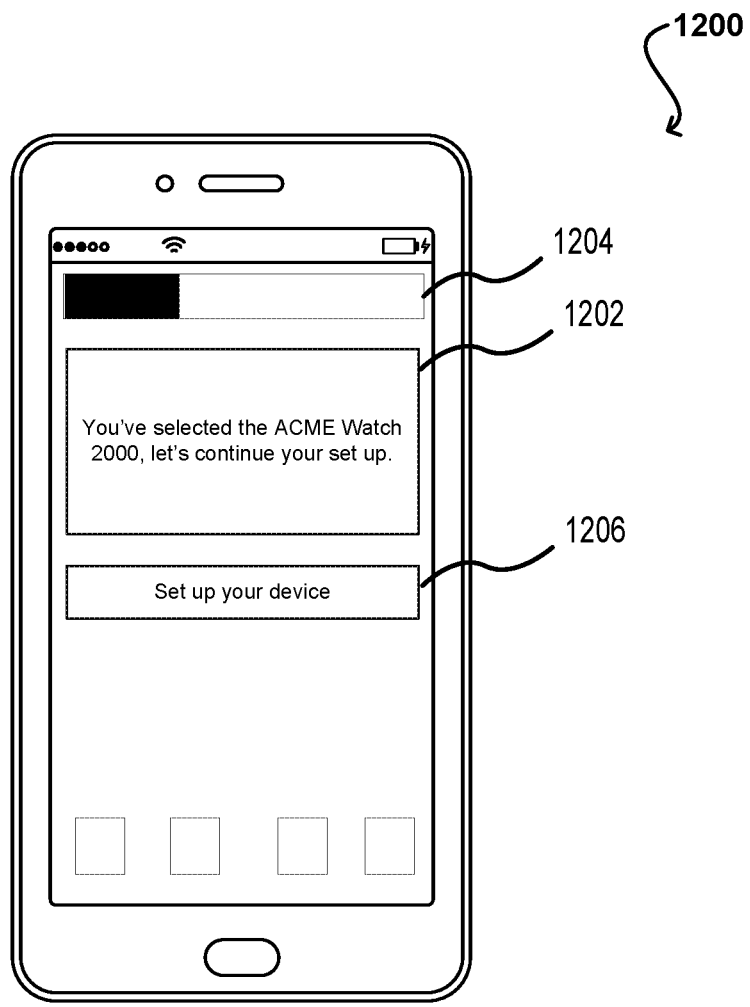
FIG. 12 illustrates an example interface that can be rendered in accordance with various embodiments.

FIG. 12 illustrates an example display 1200 of an account setup flow that can be displayed as a modal still 1202 over the launcher in this example. In other embodiments the information may need to instead be part of the streaming application. As the peripheral's code and payload have been delivered to the server, the server can know that it is genuine and which firmware is required for that peripheral. The check to determine whether the peripheral is genuine, which can be a lengthy process, can then be bypassed in this example. In this example, the model still 1202 may include a progress bar 1204 and one or more interactive icons 1206 enable the user to provide authorization for continued operation. For example, the user may select the icon 1206 to continue a registration process and/or authorize the device to obtain information, for example, from a backend server.

Figure 13:
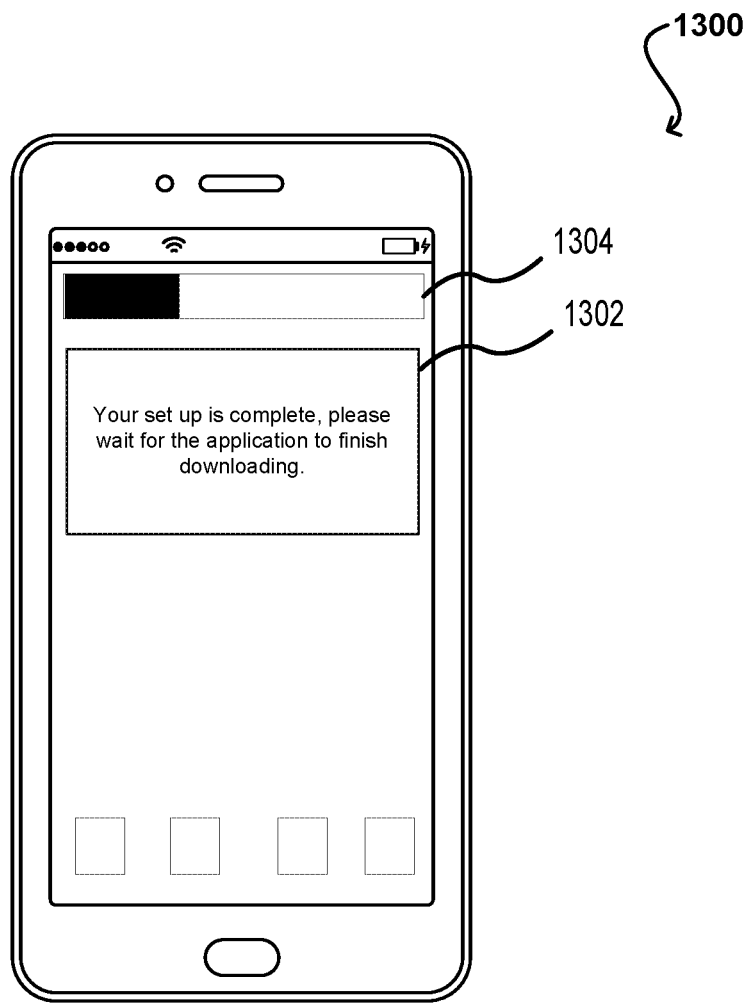
FIG. 13 illustrates an example interface that can be rendered in accordance with various embodiments.

FIG. 13 illustrates an example display 1300 continuing the account setup flow that can be displayed as a modal still 1302 over the launcher in this example. In this portion of the flow, the user has authorization the set up process, as indicated by the message providing feedback information to the user. Further illustrated is a status bar 1304 that enables the user to track the progress.

Figure 14:
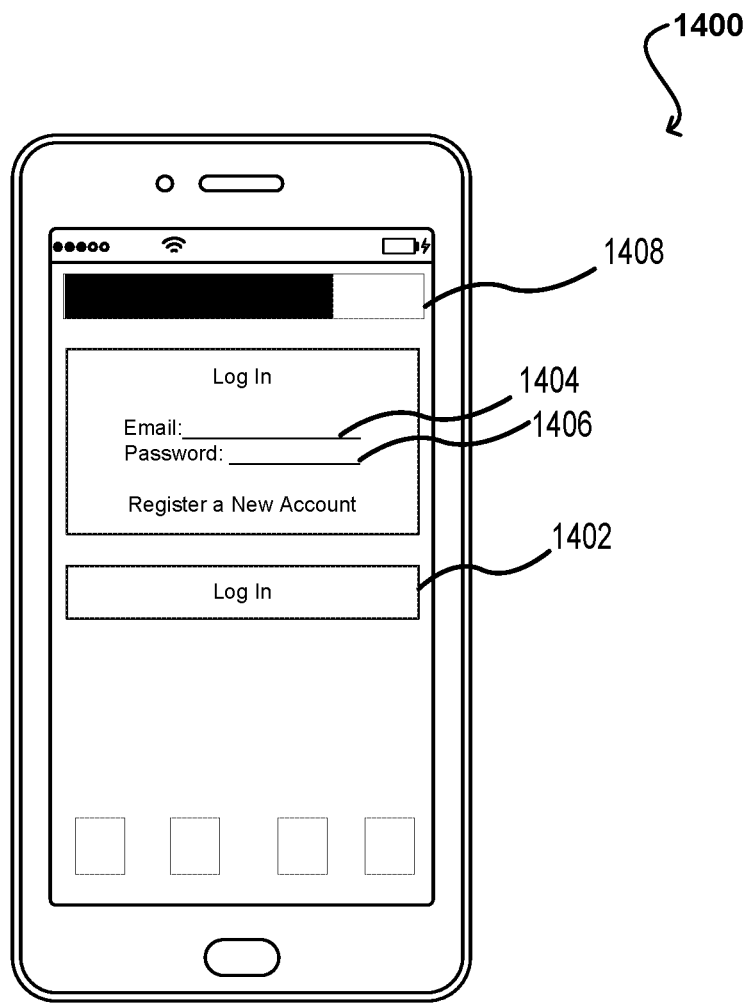
FIG. 14 illustrates an example interface that can be rendered in accordance with various embodiments.
Figure 15:
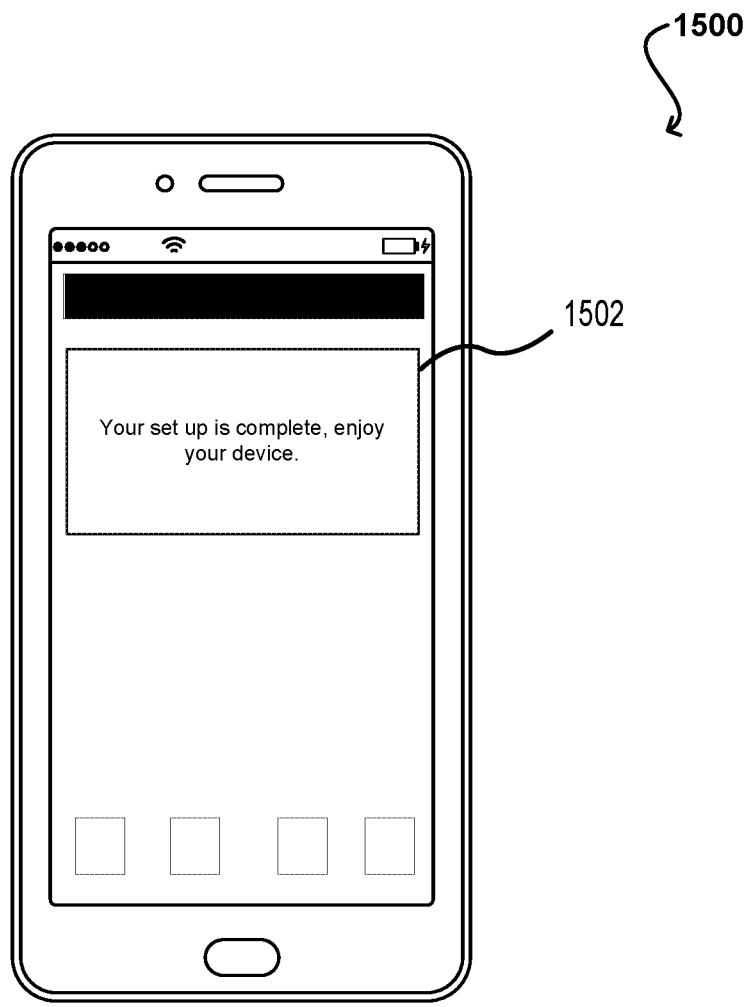
FIG. 15 illustrates an example interface that can be rendered in accordance with various embodiments.

The display 1400 of FIG. 14 enables the user to log in to an existing account with a username and password (or other such credential), or to select to register for an account, for example using fields 1404, 1406 and a selectable icon 1402. As illustrated, this is part of the streaming app displayed in the modal, as a status bar 1408 indicates that the full application is only about half downloaded. If the user has an account and is able to login, the process can go directly to the firmware update. If not, additional screens can be displayed through the modal or streaming app that can collect information for the user for use with the account. This may include any relevant information, such as may include name, birthdate, address, gender, physical characteristics, and the like. In some embodiments a standard registration flow can commence which will complete the provisional account based on the peripheral's serial number and link this to a user's login credentials. In the example display 1500 of FIG. 15, the pairing has completed and now the firmware is to be delivered to the peripheral. The process skipped selection and reading data and only had to send data to tell the peripheral the account to which it is attached, as illustrated by the message 1502 provided on the screen to communicate successful setup to the user.

Once the registration flow, above the full application, is 100% downloaded, between this and the previous screen, the process will have gone through a standard Bluetooth® exchange, fetching secondarily encrypted data from the tracker and sending it to the provider backend. The user is authenticated, the wearable updated, and the account attachment data pushed to the peripheral device.

Figure 16A:
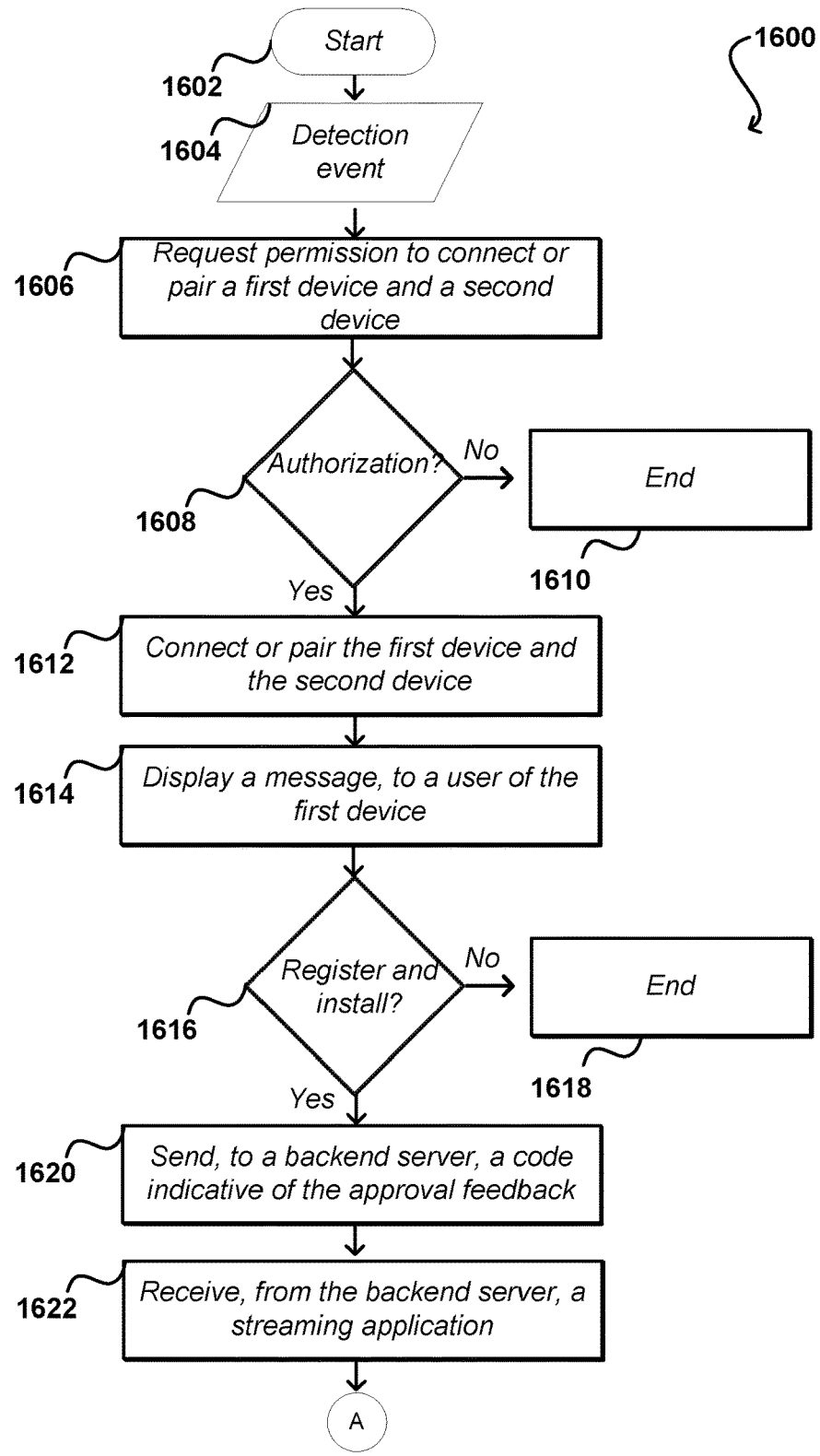
FIGS. 16A and 16B illustrate portions of an example process that can be utilized in accordance with various embodiments.
Figure 16B:
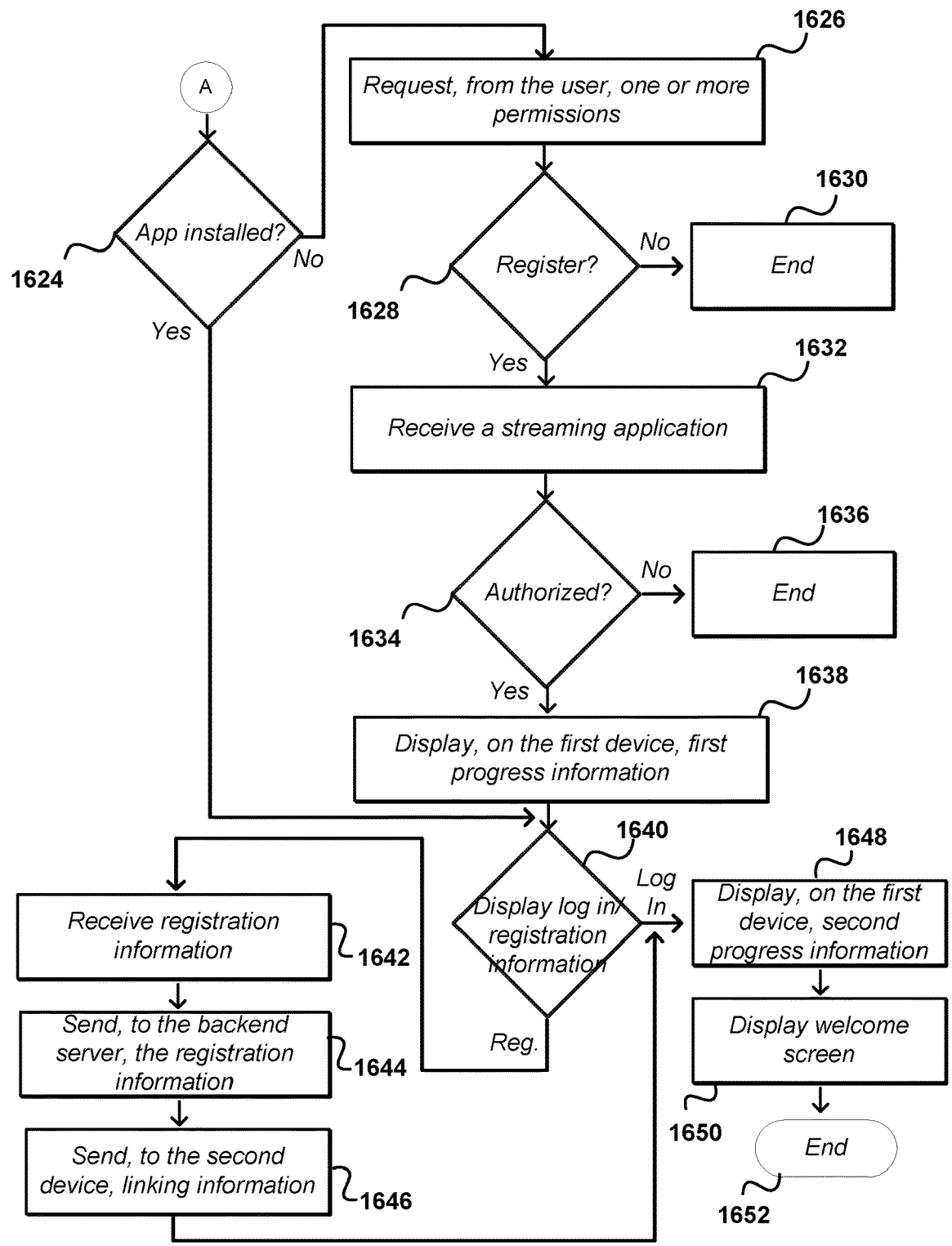

FIGS. 16A and 16B illustrate portions of an example process 1600 that can be utilized in accordance with one embodiment. It should be understood for this and other processes discussed herein that there can be additional, alternative, or fewer steps performed in similar or alternative orders, or in parallel, within the scope of the various embodiments unless otherwise stated. This example process provides a flowchart view of the process discussed above, and as such will not be discussed in detail again herein.

This example begins 1602 with an input/output detection event 1604. For example, a first user device may scan and detect a second user device. As noted above, the first user device may correspond to a smart phone while the second user device may correspond to a wearable device, such as a fitness tracker. Because the wearable device may have limited capabilities, when compared to the smart phone, it may be desirable to link the devices to enable the wearable device to leverage the hardware capabilities of the smart phone. By way of example only, the wearable device may leverage a messaging application on the smart phone such that the wearable device may be used to provide a notification to the user, for example, via vibration or otherwise indications. It should be appreciated that scanning may commence upon authorization by the user. For example, the user may authorization communication between the devices where the first device scans for other devices that may be configured to connect to the first device.

In various embodiments, communication may be provided over a Bluetooth® connection where the second device advertises a data payload with information, such as a routing code. The routing code may include various information components, such as a time stamp and/or a status identifier or static value. The value may correspond to a device serial number, and as a result, may be linked to the device provider, for example at a backend server, where the device and its operations may be detected, based at least in part on the value.

In various embodiments, the first device detects the second device and provides dialog to the user for authorization to connect or pair the devices 1606. For example, the dialog may request permission to sync and/or link one or more features of the first device to the second device. In various embodiments, the user may limit how much information is transferred between devices. For example, the user may authorize the pairing for limited purposes. The user provides authorization information to the first device 1608, which refusal of authorization ends the process 1608 and authorization (of at least one operation) enables connection between the devices 1612. For example, connection may be completed via a BTLE bond.

This example continues with the first device displaying a message to the user to register and install and application, associated with the second device 1614. It should be appreciated that, in various embodiments, this step may be skipped where the user has already registered and the second device and/or already has the application installed. The user provides feedback responsive to the message 1616 and, if the user selects not to register or install, the process ends 1618. However, the user selecting to complete the registration and/or installation may prompt a communication to a provider of the second device 1620. For example, a rotating code may be transmitted to a backend server. The server may authorize the rotating code, and if authorization is successful, may return a streaming app URL to the mobile OS operating on the first device 1622.

The process continues along distinct paths based, at least in part, on a determination of whether the application is installed 1624. If the application is not installed, a request is transmitted for one or more permissions 1626. For example, the permissions may be a request to register an account associated with the provider 1628. If the user does not provide permission to register, the process ends 1630. However, if the user does provide permission to register, the process continues and a streaming app is received 1632. As noted above, in various embodiments, the streaming app refers to an application with reduced or limited functionality while a full-service application is downloaded in the background. As a result, the user can perform some functionality, such as registering their account, while the full application is downloading, providing an improved user experience over waiting for the entire download process before beginning to enter information. In various embodiments, the display of the first device may provide input options associated with the streaming application.

In various embodiments, the method continues with a second request for authorization, such as a request to make wireless connection between the first device and the second device 1634. If the user does not provide permission, the process ends 1636. If the user provides permission, information may be displayed to the user 1638 regarding the set up and authorization process. For example, the user may be presented with registration information, on the first device, such as to select a model number of the second device. In various embodiments, the first device displays a log in screen, as described above, which provides users with options to either log in with a registered account of select an option to register a new account 1640. New users, for example, my sign up for new accounts. The new user may receive registration information 1642 and respond to one or more queries of the registration information. This information may be transmitted to a backend server 1644, which may provide one or more credentials or the like, to link the user account to the second device 1646. As a result, the second device may be linked or otherwise associated with the user account.

As noted above, if the application is already installed, then the process may proceed directly to displaying the log in screen 1640. If the user has registered, as noted above, a log in process may begin, where second progress information is presented to the user 1648. For example, the user may receive information regarding updates (e.g., firmware updates, application updates, download updates, etc.). Upon confirming the credentials provided with the log in information, a welcome screen is displayed to the user 1650 before the method ends 1652. As a result, the main application may launch, without requesting new permissions, which were already obtained as described above, and the user may be granted full functionality of the application.

In the case where the setup is proceeding and there is no network (e.g., Internet) connectivity available to the mobile phone, but there is another mobile device nearby that has the assets and firmware image required that is detectable, the second mobile device can authenticate the asset request via passing the code itself from the mobile device (that it retrieved from the wearable device). In this case the flow will be as normal except that connectivity is lost between the web and the mobile. Such a method can be used for generally authorizing wearable and mobile devices for exchanging assets in a somewhat secure manner. A complex Bluetooth® link can be established between the devices moving data bi-directionally in at least some embodiments.

Figure 17:
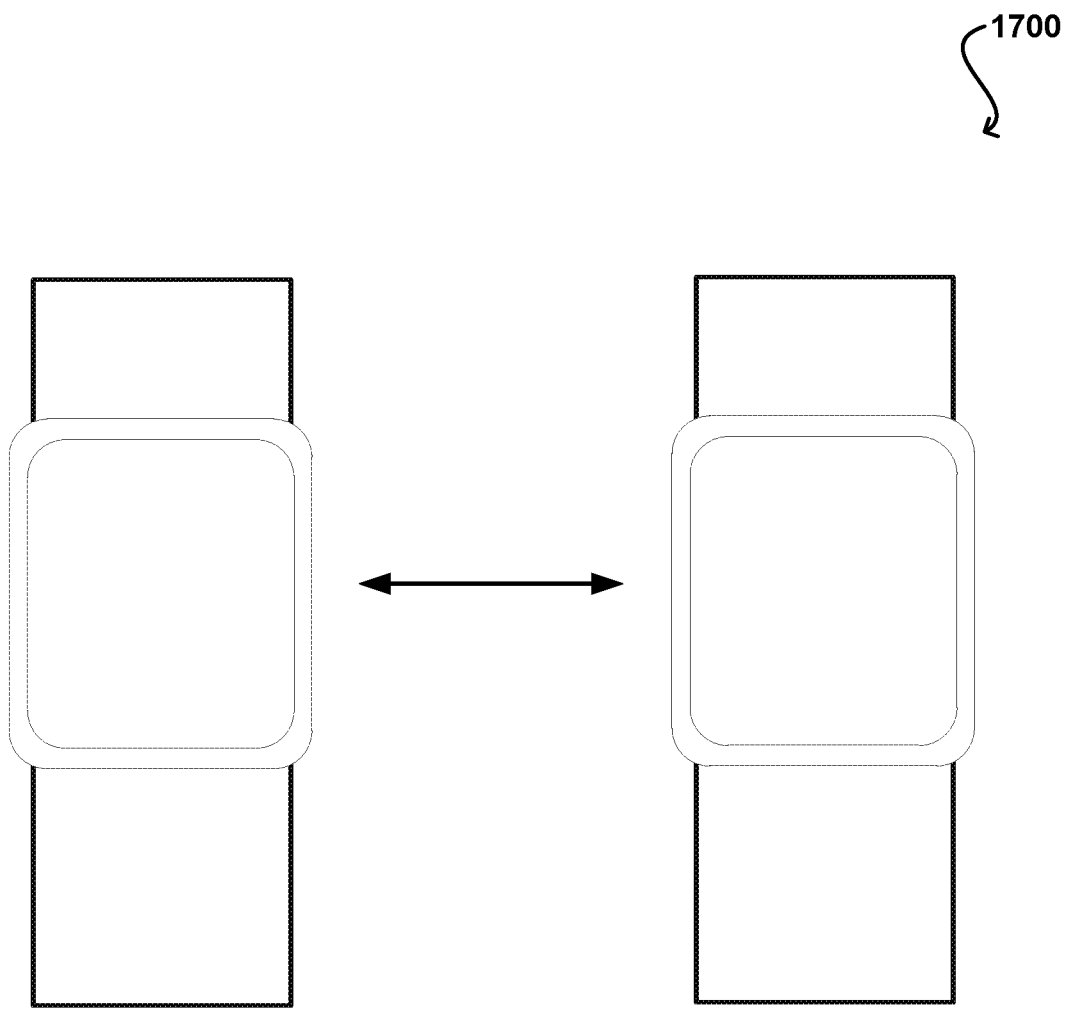
FIG. 17 illustrates an example pairing approach that can be utilized in accordance with various embodiments.

In some embodiments the wearable or peripheral devices can communicate information directly for purposes of authentication. The example situation 1700 of FIG. 17 illustrates such a transfer of data. In the wearable to wearable case, for example, two applications could authenticate each other by evaluating what the other was advertising. If the values match, the devices could establish a direct Bluetooth link and exchange data. The wearable, mobile, and site would have to modulate the advertised code if the user were linked and authenticated. In this way two separate devices could verify that they were logged in and/or linked to an account, and can exchange data, such as for a game where two players are competing with each other for steps, or where proximity is important such as a dating application. As illustrated, the watches can exchange rotating codes and payload in the advertising data. The connection can utilize extremely low power bandwidth and high latency, but relatively secure communication if both provisioned with the same secret and algorithms.

Figure 18:
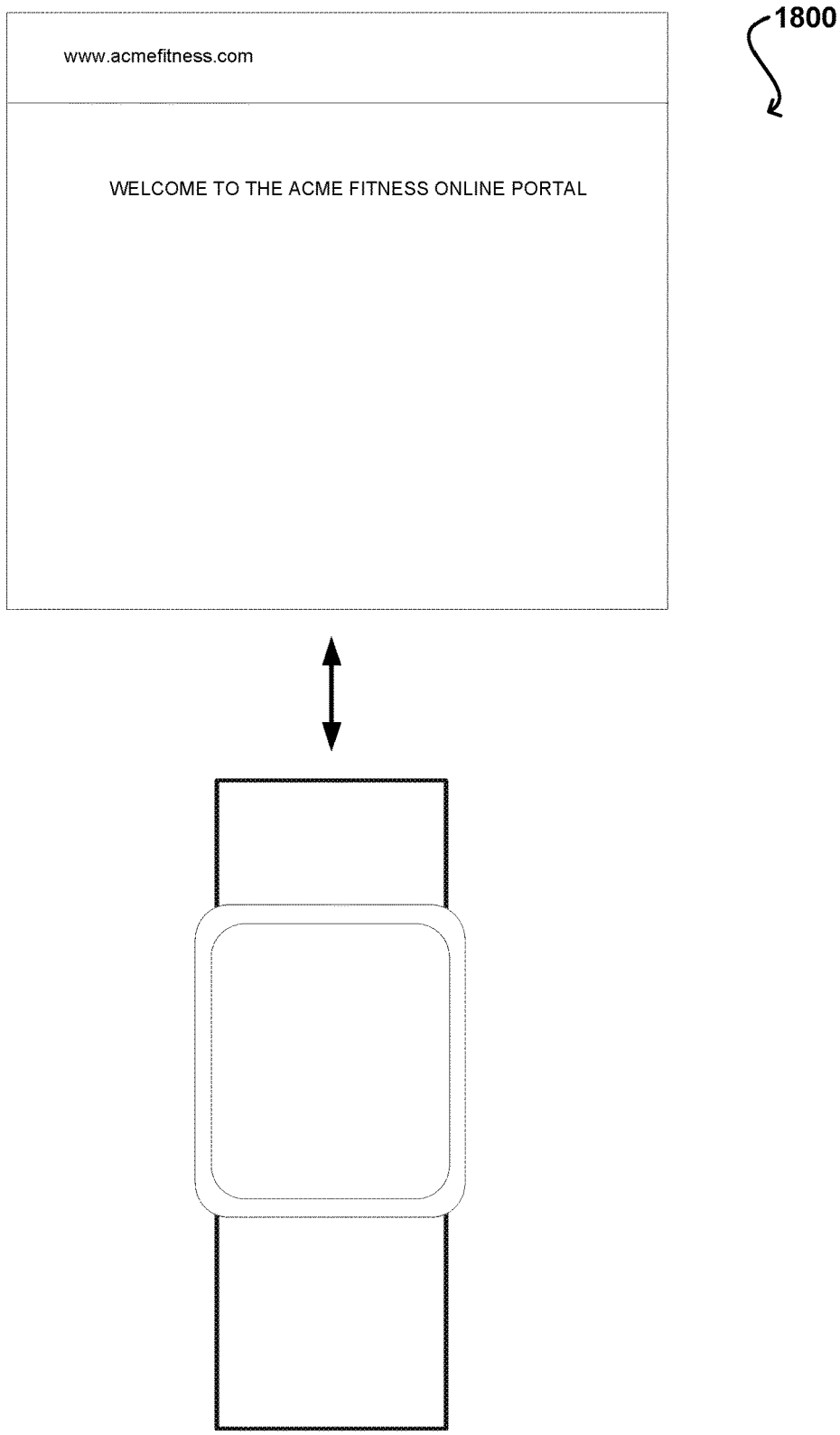
FIG. 18 illustrates an example pairing approach that can be utilized in accordance with various embodiments.

Another example use case is illustrated in the example situation 1800 of FIG. 18. In this example an application such as a Web browser is able to access BLE. With the code being shared with the backend and rotating, the detection of the watch by a Web application using a technology such as WebBLE could allow immediate authentication and/or authorization, which can be revoked when the wearable is no longer able to be scanned.

In some embodiments the process can utilize "just works" pairing wherein the code used for pairing is always all zeros. Both sides know that, and they exchange this pre-shared code. This enables syncing with multiple devices and be paired everywhere, without the user having to use the code entry process each time. The code requested can be something that comes from the provider backend. Rotating codes can also be used as mentioned, where the image can be flashed onto the wearable device and used with a pre-defined algorithm as discussed above. Such an approach enables both parties to determine the code while making the code difficult for third parties to guess. Further, obtaining a code and additional information about the peripheral device provides for a determination of the peripheral device being setup, without having to go through the conventional steps of the user manually picking through an interface, then connecting, validating the MAC address, etc. The information is known at the provider server, so the user has a provisional account already established. If available, other login credentials may be used as may correspond to accounts with the OS provider, social media sites, and the like. Further, the permissions obtained during this process can be transferred to the main application so the main application does not need to independently obtain those permissions.

The streaming app technology can be any appropriate technology, such as the Vector Watch software platform offered by Fitbit®. Description of this technology is provided in U.S. patent application Ser. No. 15/063,936, entitled "Systems and Methods for Distributing Application Templates to Wearable Client Devices," filed Mar. 8, 2016, which is hereby incorporated herein by reference in its entirety and for all purposes.

The ability to use the rotating codes with device connections can enable the peripheral device to connect to various devices for various purposes, assuming the relevant backend(s) is able to determine the current code. This can include, for example, paying for transportation by a device detecting and recognizing the peripheral device being worn by the user. Users can also locate other users or compatible devices, among other such options. If permissions are available, such an approach can be used to validate the user, such that multiple accounts can be automatically provisioned to a new device.

As mentioned, although Bluetooth® is provided as a primary example, any appropriate communication technology or out of band channel can be utilized to transfer the relevant data. This can include, for example, other wireless connections, wired connections, audio, video, text displays, ultrasonic signals, and the like. Further, once a secure connection is established between devices then any relevant data can be transmitted over the connection, such as may allow one wearable device to obtain an application update over a wireless connection to another wearable device that has a network connection over which the update may be obtained. If the other wearable has the update information then the update may be able to be obtained without any network connectivity.

Devices utilizing wireless communications can utilize multiple communications subsystems, as may utilize multiple antennas. An example antenna architecture for wearable electronic devices includes two portions. First, the antenna architectures include a monopole antenna having a monopole radiator on a plastic carrier implemented at a top of a display area within a metal housing of the device. The monopole radiator is connected through an antenna clip on a printed circuit board (PCB) to a radio frequency (RF) engine. The monopole antenna can be implemented as a flex film antenna radiator assembled on, for example, a plastic carrier. The monopole radiator can generate electromagnetic fields to induce the slot antenna to transmit or receive radio frequency signals. The antenna can be designed to be particularly receptive to (or emissive of) radio frequency energy at frequencies within the frequency band(s) for the wireless communications protocol(s) that the antenna is designed to support, and the antenna can also be designed to not be particularly receptive to (or emissive of) radio frequency energy at frequencies outside of the frequency band(s). Antennas may achieve such selectivity by virtue of their physical geometry and the dimensions that define that geometry.

Second, the antenna architectures include a slot antenna formed by a gap between a metal (and/or conductive) plate and the metal housing. The slot antenna radiates RF signals from the slot structure through a display module, a touch module, and a glass window. The monopole radiator and slot antenna are capacitively coupled such that the monopole radiator generates a varying electric field that induces varying electric fields at the slot antenna, resulting in the reception and/or emission of RF signals. This coupling of electric fields between the monopole radiator and the slot antenna allows for RF signals to be transmitted from and received by the device. The monopole radiator is positioned within the slot area to excite the slot antenna through electromagnetic field coupling. The dimensions of the slot antenna and monopole antenna can be tuned to achieve targeted communication frequency bands. Furthermore, the monopole antenna portion can be tuned to have a certain length and a matching circuit on the PCB may be utilized to tune the antenna impedance to achieve targeted performance characteristics. In some embodiments, the metal plate and/or metal housing can be conductive. The metal plate and/or metal housing can include one or more materials that include a conductivity of 1E5 Siemens/m and/or higher.

In some embodiments, the disclosed monopole-excited slot antenna reduces the dead band of the display window or provide a desirably or advantageously small dead band at a top of the display window. The monopole antenna component that excites the slot antenna can provide a targeted excitation for the slot antenna with a reduced distance between a top side of the metal housing and a display module relative to a pure monopole antenna or inverted-F antenna (IFA) architecture with similar antenna performance.

In some embodiments, the disclosed monopole-excited slot antenna accommodates a device architecture having a printed circuit board (PCB) mounted close to the bottom of a metal housing. For tapered metal housings, this allows a relatively large battery to be placed above the PCB and within the metal housing. In contrast, devices with similar tapered metal housings employing other antenna designs may require the PCB to be mounted above the battery to achieve suitable performance, manufacturing costs, and/or mechanical complexity. In such devices, the battery size is reduced relative to devices that incorporate the antenna architectures disclosed herein that allow the battery to be placed above the PCB.

In some embodiments, the disclosed monopole-excited slot antenna design resides entirely within the metal housing. Advantageously, this facilitates manufacturing the device to be water resistant and/or swim proof. Where at least some portion of the antenna is exterior to the metal housing, vias, or holes in the metal housing may be required to send and receive electrical signals to the portion of the antenna outside of the metal housing. These vias or holes may compromise any water-tight capabilities of the device or may undesirably increase the cost of making such a device water resistant and/or swim proof.

In some embodiments, the disclosed monopole-excited slot antenna designs exert no contact pressure force on the glass window. Advantageously, this facilitates manufacturing the device to be water resistant and/or swim proof, creating water-tight seals for junctions between components. Where an antenna exerts an outward force on the display window, for example, the display window may tend to separate from the metal housing, compromising the water-tight seal.

Example monopole-excited slot antenna functions by using a capacitively-coupled monopole antenna radiator to excite an antenna slot. Relative to a device that uses a slot antenna with a direct feed from a PCB to excite the slot antenna, the disclosed antenna design may be advantageous due at least in part to being mechanically simpler (e.g., not requiring the using of a coaxial cable or other transmission line from the PCB to the antenna) resulting in a lower cost and increased ease of manufacture.

Various implementations discussed herein may be used, for example, to provide a monopole-excited slot antenna that provides Bluetooth® functionality, including Bluetooth Low Energy (Bluetooth LE or BTLE) functionality. Such a compact and efficient antenna may be of particular use in highly-integrated devices having a small form factor. For example, the disclosed antennas can be used in biometric monitoring devices, e.g., wearable devices that track, report, and communicate various biometric measurements, e.g., distance traveled, steps taken, flights of stairs climbed, etc. Such devices may take the form of a small device that is clipped to a person's clothing or worn on a person's wrist. Such a device may, for example, contain various processors, printed circuit boards, sensors, triaxial accelerometers, triaxial gyroscopes, triaxial magnetometers, an altimeter, a display, a vibramotor, a rechargeable battery, a recharging connector, and an input button all within a metal housing that measures approximately between 1.62" and 2" in length, 0.75" and 0.85" in width, and 0.3" and 0.44" in thickness. A monopole-excited slot antenna may be used in such a device to provide RF communication in a water resistant and/or swim-proof wearable device, to reduce the dead band of a display window, and/or to provide a more cost-efficient and mechanically simple device.

Due to the small size of such devices, monopole-excited slot antennas, such as those disclosed herein, may provide the ability to offer a more compact communications solution than might otherwise be possible, allowing additional volume within the metal housing to be made available for other purposes, such as a larger battery. Such dimensions may prove to be particularly well-suited to RF communications in the Bluetooth wireless protocol bands, e.g., 2402 MHz to 2480 MHz.

Monopole-excited slot antenna antennas that support other wireless communications protocols may also be designed using the principles outlined herein. For example, the disclosed antenna architectures may be configured or dimensioned to be suitable for use with wireless networks and radio technologies, such as wireless wide area network (WWAN) (e.g., cellular) and/or wireless local area network (WLAN) carriers. Examples of such wireless networks and radio technologies include but are not limited to Long Term Evolution (LTE) frequency bands or other cellular communications protocol bands, GPS (Global Positioning System) or GNSS (Global Navigation Satellite System) frequency bands, ANT™, 802.11, and ZigBee™, for example, as well as frequency bands associated with other communications standards. The RF radiator size, gaps between components, and other parameters discussed herein may be adjusted as needed in order to produce a monopole-excited slot antenna, as described herein, that is compatible with such other frequency bands.

Below the metal plate is positioned a battery (not shown). The battery can be secured within the metal housing to maintain its relative position within the metal housing. For example, a spacer can be used to maintain a separation between the battery and the metal housing. Below the battery is positioned a component layer on a PCB. The component layer can include microprocessors, RAM (random access memory), ROM (read only memory), ASICs (application specific integrated circuit), FPGAs (field programmable gate array), surface mounted elements, integrated circuits, and the like. The PCB provides electrical components and circuitry that directs and interprets electrical signals for the device. For example, the PCB is electrically coupled to the display and touch modules to interpret touch input and to provide images or information to display. The PCB is coupled to an antenna feed clip that is electrically coupled to the monopole antenna. The PCB can include a ground plane area that forms a ground plane for the monopole antenna. The PCB can include a feed clip area that does not include conductive elements other than where the antenna feed clip is mounted on and electrically coupled to the PCB. For example, the PCB can include a trace that electrically couples the ground plane area to the feed clip area, the feed clip being electrically coupled to the trace in the feed clip area. The ground plane for the monopole antenna may be provided by a large metalized area, conductive traces in a printed circuit board (e.g., the PCB) or flexible printed circuit board, a metal plate and/or surface within the metal housing, etc. The device can also include a vibrating motor to provide haptic feedback or to otherwise mechanically vibrate the device. The PCB can be grounded to the metal housing through one or more grounding screws that electrically couple the PCB to the metal housing. Between the battery and component layer, there is a dielectric gap (e.g. air or plastic or combination of air and plastic) which creates a back cavity for the slot antenna within an enclosed metal housing design. The dielectric gap may vary in height, but must insure isolation between the battery to any component on the component layer.

An alternative configuration includes a slot antenna that is directly fed from the PCB rather than being coupled to a monopole antenna, with the PCB being placed above the battery. In devices with tapered cross-sections, this may undesirably reduce the size of the battery. Another alternative configuration includes a slot antenna that is directly fed from the PCB rather than being coupled to a monopole antenna, with the PCB below the battery. This would require the use of a feed line (e.g., coaxial cable) from the PCB to the metal plate or metal housing near the metal plate to excite the fields between the metal housing and the metal plate. Using a coaxial cable complicates the mechanical implementation and increases the cost of the device. Furthermore, the disclosed antenna architectures can be configured to achieve similar performance characteristics as an elevated feed design using a coaxial cable. Another alternative configuration includes a monopole or IFA antenna outside the metal housing. One drawback of this design is the introduction of additional mechanical complexity and added difficulties in achieving a device that is water resistant and/or swim proof. The antenna feed would typically connect the PCB inside the metal housing to the antenna located outside the metal housing. Accordingly, the disclosed antenna architectures can be housed entirely within the metal housing to facilitate water resistance of the device.

Figure 19:
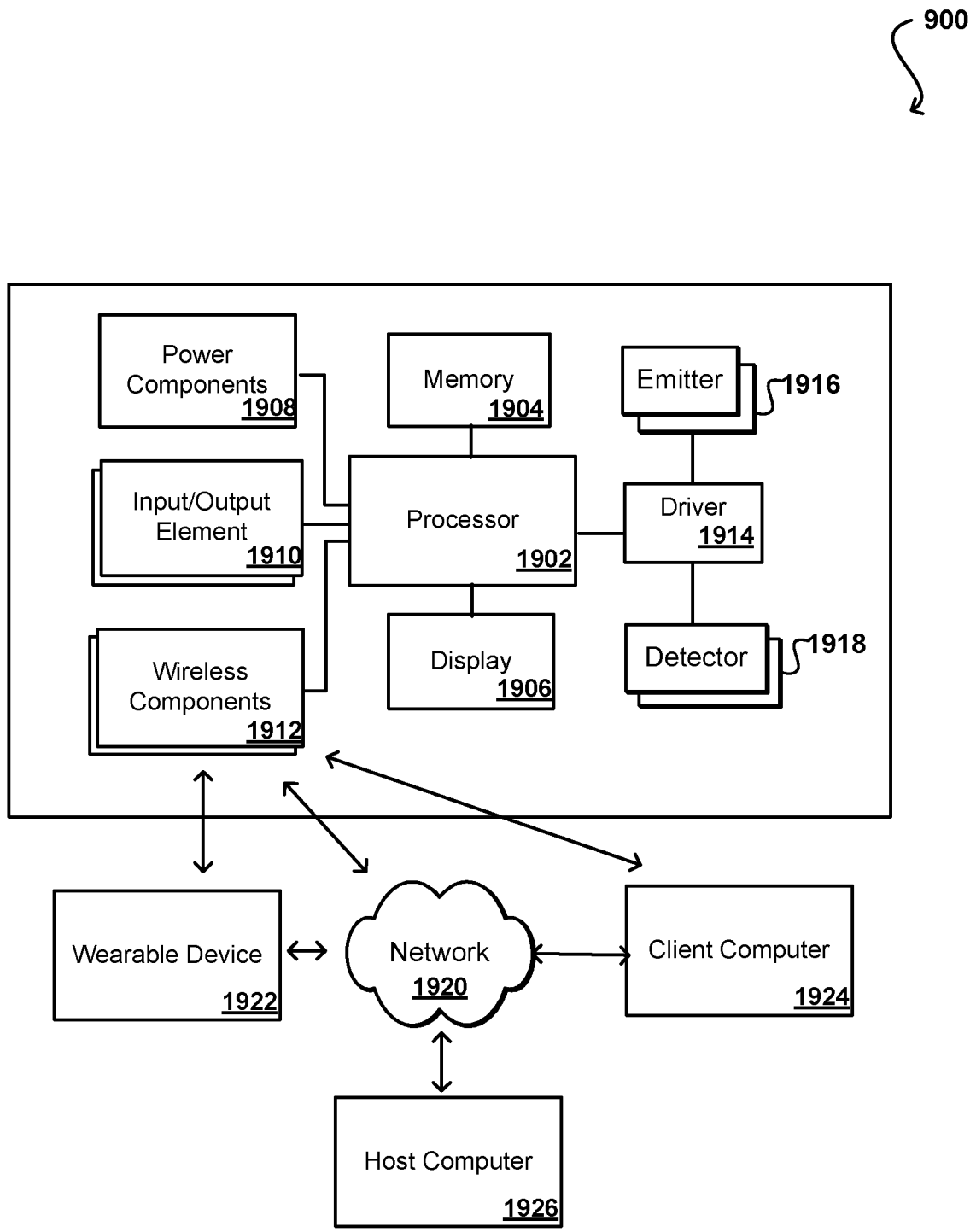
FIG. 19 illustrates components of an example computing device that can be utilized in accordance with various embodiments.

FIG. 19 illustrates components of an example cycle prediction system 1900 that can be utilized in accordance with various embodiments. In this example, the device includes at least one processor 1902, such as a central processing unit (CPU) or graphics processing unit (GPU) for executing instructions that can be stored in a memory device 1904, such as may include flash memory or DRAM, among other such options. As would be apparent to one of ordinary skill in the art, the device can include many types of memory, data storage, or computer-readable media, such as data storage for program instructions for execution by a processor. The same or separate storage can be used for images or data, a removable memory can be available for sharing information with other devices, and any number of communication approaches can be available for sharing with other devices. The device typically will include some type of display 1906, such as a touch screen, organic light emitting diode (OLED), or liquid crystal display (LCD), although devices might convey information via other means, such as through audio speakers or projectors.

A tracker or similar device will include at least one motion detection sensor, which as illustrated can include at least one I/O element 1910 of the device. Such a sensor can determine and/or detect orientation and/or movement of the device. Such an element can include, for example, an accelerometer, inertial sensor, altimeter, or gyroscope operable to detect movement (e.g., rotational movement, angular displacement, tilt, position, orientation, motion along a non-linear path, etc.) of the device. An orientation determining element can also include an electronic or digital compass, which can indicate a direction (e.g., north or south) in which the device is determined to be pointing (e.g., with respect to a primary axis or other such aspect). A device may also include an I/O element 1910 for determining a location of the device (or the user of the device). Such a positioning element can include or comprise a GPS or similar location-determining element(s) operable to determine relative coordinates for a position of the device. Positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination. The I/O elements may also include one or more biometric sensors, optical sensors, barometric sensors (e.g., altimeter, etc.), and the like.

As mentioned above, some embodiments use the element(s) to track the location and/or motion of a user. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. The example device also includes one or more wireless components 1912 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art. The device also includes one or more power components 1908, such as may include a battery operable to be recharged through conventional plug-in approaches, or through other approaches such as capacitive charging through proximity with a power mat or other such device. In some embodiments the device can include at least one additional input/output device 1910 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As mentioned, many embodiments will include at least some combination of one or more emitters 1916 and one or more detectors 1918 for measuring data for one or more metrics of a human body, such as for a person wearing the tracker device. In some embodiments this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device includes emitters 1916 and detectors 1918 capable of being used for obtaining other biometric data, which can be used with example circuitry discussed herein.

If included, a display 1906 may provide an interface for displaying data, such as HR, ECG data, blood oxygen saturation ($SpO_2$) levels, and other metrics of the user. In an embodiment, the device includes a wristband and the display is configured such that the display faces away from the outside of a user's wrist when the user wears the device. In other embodiments, the display may be omitted and data detected by the device may be transmitted using the wireless networking interface via near-field communication (NFC), Bluetooth, Wi-Fi, or other suitable wireless communication protocols over at least one network 1920 to a host computer 1922 for analysis, display, reporting, or other such use.

The memory 1904 may comprise RAM, ROM, FLASH memory, or other non-transitory digital data storage, and may include a control program comprising sequences of instructions which, when loaded from the memory and executed using the processor 1902, cause the processor 1902 to perform the functions that are described herein. The emitters 1916 and detectors 1918 may be coupled to a bus directly or indirectly using driver circuitry by which the processor 1902 may drive the light emitters 1916 and obtain signals from the light detectors 1918. The host computer 1922 communicate with the wireless networking components 1912 via one or more networks 1920, which may include one or more local area networks, wide area networks, and/or internetworks using any of terrestrial or satellite links. In some embodiments, the host computer 1922 executes control programs and/or application programs that are configured to perform some of the functions described herein.

In various embodiments, approaches discussed herein may be performed by one or more of: firmware operating on a monitoring or tracker device or a secondary device, such as a mobile device paired to the monitoring device, a server, host computer, and the like. For example, the monitoring device may execute operations relating to generating signals that are uploaded or otherwise communicated to a server that performs operations for removing the motion components and creating a final estimate value for physiological metrics. Alternatively, the monitoring device may execute operations relating to generating the monitoring signals and removing the motion components to produce a final estimate value for physiological metrics local to the monitoring device. In this case, the final estimate may be uploaded or otherwise communicated to a server such as host computer that performs other operations using the value.

An example monitoring or tracker device can collect one or more types of physiological and/or environmental data from one or more sensor(s) and/or external devices and communicate or relay such information to other devices (e.g., host computer or another server), thus permitting the collected data to be viewed, for example, using a web browser or network-based application. For example, while being worn by the user, a tracker device may perform biometric monitoring via calculating and storing the user's step count using one or more sensor(s). The tracker device may transmit data representative of the user's step count to an account on a web service (e.g., www.fitbit.com), computer, mobile phone, and/or health station where the data may be stored, processed, and/or visualized by the user. The tracker device may measure or calculate other physiological metric(s) in addition to, or in place of, the user's step count. Such physiological metric(s) may include, but are not limited to: energy expenditure, e.g., calorie burn; floors climbed and/or descended; HR; heartbeat waveform; HR variability; HR recovery; respiration, $SpO_2$, blood volume, blood glucose, skin moisture and skin pigmentation level, location and/or heading (e.g., via a GPS, global navigation satellite system (GLONASS), or a similar system); elevation; ambulatory speed and/or distance traveled; swimming lap count; swimming stroke type and count detected; bicycle distance and/or speed; blood glucose; skin conduction; skin and/or body temperature; muscle state measured via electromyography; brain activity as measured by electroencephalography; weight; body fat; caloric intake; nutritional intake from food; medication intake; sleep periods (e.g., clock time, sleep phases, sleep quality and/or duration); pH levels; hydration levels; respiration rate; and/or other physiological metrics.

An example tracker or monitoring device may also measure or calculate metrics related to the environment around the user (e.g., with one or more environmental sensor(s)), such as, for example, barometric pressure, weather conditions (e.g., temperature, humidity, pollen count, air quality, rain/snow conditions, wind speed), light exposure (e.g., ambient light, ultra-violet (UV) light exposure, time and/or duration spent in darkness), noise exposure, radiation exposure, and/or magnetic field. Furthermore, a tracker device (and/or the host computer and/or another server) may collect data from one or more sensors of the device, and may calculate metrics derived from such data. For example, a tracker device may calculate the user's stress or relaxation levels based on a combination of HR variability, skin conduction, noise pollution, and/or sleep quality. In another example, a tracker device may determine the efficacy of a medical intervention, for example, medication, based on a combination of data relating to medication intake, sleep, and/or activity. In yet another example, a tracker device may determine the efficacy of an allergy medication based on a combination of data relating to pollen levels, medication intake, sleep and/or activity. These examples are provided for illustration only and are not intended to be limiting or exhaustive.

An example monitoring device may include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. A monitoring system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:

detecting, by a first device, a second device sending a code over a wireless channel;

determining, based at least in part upon the code, a type of the second device;

pairing, by the first device, with the second device via the wireless channel;

subsequent to pairing with the second device via the wireless channel and while downloading a full version of an application to the first device, receiving a request to register, with a server, a user account to be associated with the second device;

in response to receiving the request to register the user account and while downloading the full version of the application to the first device, causing a lightweight version of the application to be displayed on the first device to enable registration of the user account, the lightweight version including a subset of functionality of the full version of the application; and causing the full version of the application to be downloaded to the first device while the lightweight version of the application is displayed on the first device.

2. The method of claim 1, further comprising:

causing an interface for the lightweight version to be displayed as a modal over an interface for an application executing on the first device.

3. The method of claim 1, further comprising:

determining the user account to be associated with the second device; and enabling the second device to utilize functionality of the full version of the application executing on the first device.

4. The method of claim 1, wherein the first device is a smartphone and the second device is a wearable computing device.

5. The method of claim 1, further comprising:

requesting, from a user of the first device, authorization to allow the second device to connect to the first device; and receiving, from the user, permission to connect the first device and the second device.

6. The method of claim 1, further comprising:

in response to receiving the request to register the user account and while the full version of the application is being downloaded to the first device, receiving the lightweight version of the application;

receiving device information regarding the second device to link the user account to the second device, via the lightweight version of the application, to register the user account; and in response to the user account being registered with the server and a user logging into the user account, receiving, from the server, a firmware update to be delivered to the second device while the full version of the application is being downloaded to the first device.

7. A method, comprising:

detecting, by a first device, a second device sending a code over a wireless channel;

receiving, from a user of the first device, authorization to connect to the second device;

pairing, by the first device, with the second device, via the wireless channel;

determining, based at least in part on the second device, an application for execution on the first device, the application providing one or more features associated with the second device;

subsequent to pairing with the second device via the wireless channel and while downloading a full version of the application to the first device, receiving a request to register, with a server, a user account to be associated with the second device;

subsequent to pairing the first device with the second device, receiving, from the server, a lightweight version of the application, the lightweight version of the application providing a subset of functionality of the full version of the application; and in response to receiving the request to register the user account, executing, on the first device, the lightweight version of the application to enable the user account to be registered with the server while downloading the full version of the application to the first device.

8. The method of claim 7, further comprising:

causing an interface for the lightweight version to be displayed as a modal over an interface for an application executing on the first device.

9. The method of claim 7, further comprising:

determining the user account to be associated with the second device; and enabling the second device to utilize functionality of the second version of the application executing on the first device.

10. The method of claim 7, further comprising:

receiving device information regarding the second device to link the user account to the second device, via the lightweight version of the application, to register the user account; and in response to the user account being registered with the server and a user logging into the user account, receiving, from the server, a firmware update to be delivered to the second device while downloading the full version of the application to the first device, wherein the lightweight version of the application is received from the server in response to receiving the request to register the user account and while downloading the full version of the application to the first device.

11. The method of claim 7, further comprising:

determining the application is not installed on the first device.

12. The method of claim 7, further comprising:

receiving, from the user of the first device, one or more permissions associated with the connection between the first device and the second device, the one or more permissions enabling access to specified resources of the first device.

13. The method of claim 7, further comprising:

providing, to the server, a serial number associated with the second device, the serial number being provided via the wireless channel; and receiving, from the server, provisional account information for the second device, the provisional account information based, at least in part, on the serial number and providing access to the application.

14. The method of claim 7, wherein the first device is a smartphone and the second device is a wearable computing device.

15. The method of claim 7, wherein the wireless channel is a Bluetooth® connection.

16. A system comprising:
a first device comprising at least one processor and a memory device, the memory device including instructions that, when executed by the at least one processor, cause the first device to:
detect a second device sending a code over a wireless channel;
determine, based at least in part upon the code, a type of the second device;
pair with the second device via the wireless channel;
receive a lightweight version of an application subsequent to the first device pairing with the second device, the lightweight version including a subset of functionality of a full version of the application;
subsequent to pairing with the second device via the wireless channel and while downloading the full version of the application to the first device, receive a request to register, with a server, a user account to be associated with the second device;
in response to receiving the request to register the user account and while downloading the full version of the application to the first device, execute the lightweight version of the application to enable the user account to be registered with the server while downloading the full version of the application to the first device; and
receive the full version of the application while executing the lightweight version of the application.

17. The system of claim 16, wherein the instructions, when executed by the at least one processor, further cause the system to:
cause an interface for the lightweight version to be displayed as a modal over an interface for an executing application.

18. The system of claim 16, wherein the instructions, when executed by the at least one processor, further cause the system to:
determine a user account to be associated with the second device, and
enable the second device to utilize functionality of the full version of the application.

19. The system of claim 16, wherein the instructions, when executed by the at least one processor, further cause the system to:
receive device information regarding the second device to link the user account to the second device, via the lightweight version of the application, to register the user account; and
in response to the user account being registered with the server and a user logging into the user account, receive, from the server, a firmware update to be delivered to the second device while downloading the full version of the application to the first device,
wherein the lightweight version of the application is received from the server in response to receiving the request to register the user account and while downloading the full version of the application to the first device.

20. The system of claim 16, wherein the instructions, when executed by the at least one processor, further cause the system to:
request, from a user, authorization to allow connection to the second device; and
receive, from the user, permission to connect to the second device.

* * * * *